S. G. MILLER.
ATTACHMENT FOR PLANTERS.
APPLICATION FILED AUG. 29, 1918.
1,301,291.
Patented Apr. 22, 1919.
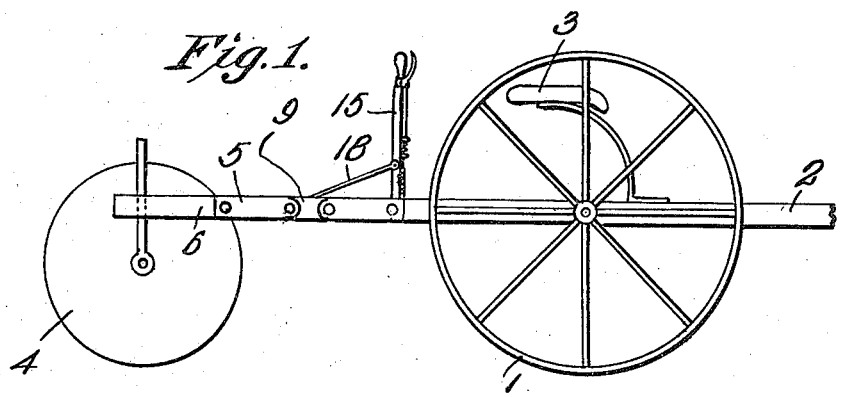
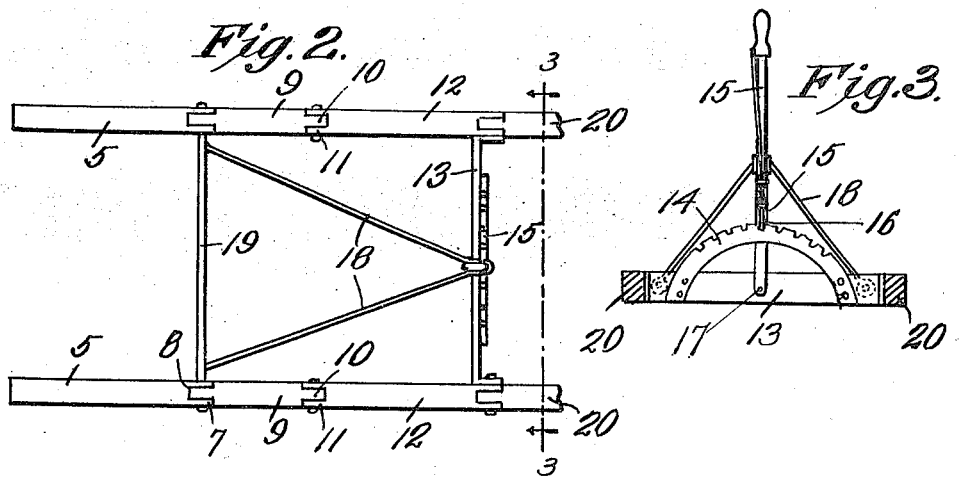
Witnesses
James F. Crown,
S. M. McColl
Inventor
Stuart G. Miller,
By Richard B. Owen,
Attorney

UNITED STATES PATENT OFFICE.

STUART G. MILLER, OF CROCKETT, VIRGINIA.

ATTACHMENT FOR PLANTERS.

1,301,291.  Specification of Letters Patent.  Patented Apr. 22, 1919.

Application filed August 29, 1918. Serial No. 251,978.

*To all whom it may concern:*

Be it known that I, STUART G. MILLER, a citizen of the United States, residing at Crockett, in the county of Wythe and State of Virginia, have invented certain new and useful Improvements in Attachments for Planters, of which the following is a specification.

This invention relates to agricultural implements, and more particularly to planters.

The object of the invention is to provide an attachment for planters to adapt them for use on hillsides and which is adjustable to different inclines.

Another object is to provide an attachment of this character which may be quickly applied to and removed from any planter.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a planter equipped with this attachment, Fig. 2 is a top plan view of the attachment with parts broken out, and Fig. 3 is a transverse section taken on the line 3—3 of Fig. 2.

In the embodiment illustrated, a planter of ordinary construction is shown including supporting wheels 1, a draft tongue 2, a seat 3, and covering disks 4.

The attachment constituting this invention, which is designed to provide for tilting of the covering disks 4 to adapt the planter for use on hillsides comprises a pair of bars 5 designed to be pivotally connected at their rear ends to bars 6 which carry the covering disks 4. These bars 5 are bifurcated at their front ends and arranged between the furcations 7 thereof are reduced ends 8 of intermediate bars or links 9. These links or bars 9 have their front ends also reduced to provide tongues as shown at 10 which fit between and are pivotally connected with furcations 11 of front bars 12. A cross bar 13 connects the front ends of the bars 12 being rigidly secured thereto and has supported thereon a semi-circular rack 14 with which is designed to be engaged a lever 15 having the usual spring pressed dog 16. The lever 15 is fulcrumed at one end on a cross bar 13 as shown at 17 and brace rods 18 are connected at one end with said lever intermediately of its ends and at their other ends with the cross bar or rod 19, said bars 18 diverging toward the rear as shown clearly in Fig. 2. The cross rod 19 also performs the function of a pintle for connecting the ends of the bars 5 and 9 as is shown clearly in Fig. 2.

In the use of this attachment, when it is desired to tilt the covering disks, the lever 15 is shifted to exert a twisting motion on the double joint frame constituting the connection between the covering disks and the planter proper and when the desired angle is reached, it is locked in adjusted position by engagement of the dog 16 with the teeth of the rack 14.

From the above description it will be obvious that this attachment may be applied to any ordinary planter by the use of connecting bolts for connecting the rear ends of the bars 5 with the disk supporting frame bars 6 and the front ends of bars 12 with the planter frame bars 20.

This device, while very simple and cheap to manufacture will accomplish the purpose for which it is intended and may be easily removed or applied in the manner above set forth.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. The combination with a planter having covering disks, a flexible connection uniting said disks and planter, a cross bar carried by said connection, a toothed rack carried by said bar, and a lever connected to actuate said connection and having means for engaging said rack to hold the disks in adjusted position.

2. An attachment of the class described comprising side bars each composed of a plurality of pivotally connected links, a rod connecting said side bars, a cross bar connecting said side bars in advance of said rod, brace rods connected at one end to said cross rod and converging toward their free ends, a lever connected with said ends and fulcrumed on said cross bar, a rack carried by said cross bar, and a dog carried by said lever for engaging said rack.

In testimony whereof I affix my signature in presence of two witnesses.

STUART G. MILLER.

Witnesses:
W. H. RIGGLE,
W. P. MILLER.

Copies of this patent may be obtained for five cents each, by addressing the "Commissioner of Patents, Washington, D. C."